US006794784B2

(12) United States Patent
Takahashi et al.

(10) Patent No.: US 6,794,784 B2
(45) Date of Patent: Sep. 21, 2004

(54) PERMANENT MAGNET RELUCTANCE MOTOR WITH EMBEDDED PERMANENT MAGNET HOLES

(75) Inventors: Norio Takahashi, Kanagawa-ken (JP); Yutaka Hashiba, Kanagawa-ken (JP); Kazuto Sakai, Kanagawa-ken (JP); Masanori Arata, Kanagawa-ken (JP); Yukihiko Kazao, Kanagawa-ken (JP); Takashi Araki, Mie-ken (JP); Masakatsu Matsubara, Mie-ken (JP); Yasuo Hirano, Mie-ken (JP)

(73) Assignees: Kabushiki Kaisha Toshiba, Kawasaki (JP); Toshiba Industrial Products Manufacturing Corporation, Mie-ken (JP)

( * ) Notice: Subject to any disclaimer, the term of this patent is extended or adjusted under 35 U.S.C. 154(b) by 0 days.

(21) Appl. No.: 09/863,402

(22) Filed: May 24, 2001

(65) Prior Publication Data

US 2002/0047435 A1 Apr. 25, 2002

(30) Foreign Application Priority Data

May 25, 2000 (JP) ..................................... P2000-154241

(51) Int. Cl.[7] ......................... H02K 19/00; H02K 21/12
(52) U.S. Cl. ............................ 310/156.56; 310/156.53; 310/261
(58) Field of Search ..................... 310/156.53, 156.54, 310/156.01, 156.55, 156.49, 156.56, 156.57, 168, 261

(56) References Cited

U.S. PATENT DOCUMENTS

| 5,097,166 | A | * | 3/1992 | Mikulic ........................ 310/156 |
| 5,369,325 | A | * | 11/1994 | Nagate et al. ............ 310/156.54 |
| 5,679,995 | A | * | 10/1997 | Nagate et al. ............... 310/156 |
| 5,962,944 | A | * | 10/1999 | Narita et al. ................ 310/156 |
| 6,008,559 | A | * | 12/1999 | Asano et al. ............ 310/156.53 |
| 6,087,751 | A | * | 7/2000 | Sakai ........................ 310/156 |
| 6,268,677 | B1 | * | 7/2001 | Takabatake et al. ... 310/156.55 |
| 6,274,960 | B1 | * | 8/2001 | Sakai et al. ................ 310/156 |
| 6,329,734 | B1 | * | 12/2001 | Takahashi et al. ..... 310/156.56 |
| 6,353,275 | B1 | * | 3/2002 | Nishiyama et al. ..... 310/156.53 |
| 6,486,581 | B2 | * | 11/2002 | Miyashita et al. ..... 310/156.53 |
| 2002/0047435 | A1 | * | 4/2002 | Takahashi et al. ..... 310/156.56 |

FOREIGN PATENT DOCUMENTS

| EP | 0 872 944 A1 | 10/1998 | |
| EP | 0991 166 A3 | 9/1999 | |
| EP | 0 991 166 A2 | 4/2000 | |
| JP | 05056583 | * 3/1993 | ............ H02K/1/27 |
| JP | 2000-245123 | * 9/2000 | |
| JP | 2000-316262 | * 11/2000 | |

OTHER PUBLICATIONS

U.S. patent application Ser. No. 09/510,675, filed Feb. 22, 2000, to Takahasi.
Miller et al., "Design of a Synchronous Reluctance Motor Drive," IEEE Transactions on Industry Applications (Jul./Aug. 1991), 27(4):741–749.
Staton et al., "Optimisation of the Synchronous Reluctance Motor Geometry," IEE Conf. Electr. Machines and Drives (Sept. 1991), pp. 156–160.
Honda et al., "Rotor design optimisation of a multi–layer interior permanent–magnet synchronous motor," IEE Proc. Electr.–Power Appl. (Mar. 1998), 145(2):119–124.
Sakai et al., "High Effciency and High Performance Motor for Energy Saving in Systems," IEEE Power Engineering Society (Jan. 28, 2001), pp. 1413–1418.

* cited by examiner

*Primary Examiner*—Dang Le
*Assistant Examiner*—Heba Y. Elkassabgi
(74) *Attorney, Agent, or Firm*—Finnegan, Henderson, Farabow, Garrett & Dunner, L.L.P.

(57) ABSTRACT

Permanent magnets are arranged to be supported by the provision of permanent magnet position-locating projections (12) in permanent magnet embedding holes (5). By optimizing the shape of thin-wall regions (18) and (19) within rotor core (4), leakage of flux generated from the permanent magnets is reduced and the strength of the thin-wall regions where stress is concentrated is ensured.

11 Claims, 6 Drawing Sheets

PERMANENT MAGNET RELUCTANCE MOTOR WITH EMBEDDED PERMANENT MAGNET HOLES

BACKGROUND OF THE INVENTION

1. Field of the Invention

The present invention relates to a permanent magnet reluctance motor wherein a plurality of permanent magnets are provided in combination.

2. Description of the Related Art

A permanent magnet reluctance motor according to previous applications by the present applicants (Japanese Patent Application Number H. 11-043869 and Japanese Patent Application Number H. 11-122000) is of the construction shown in radial cross-section in FIG. 1. In FIG. 1, a stator 1 is provided with an armature coil 2, within which a rotor 3 is provided.

Rotor 3 is provided with a rotor core 4 and permanent magnet 6. In rotor core 4 there are formed a direction where magnetization is easy and a direction where magnetization is difficult. Specifically, in order to form magnetic irregularities, rotor core 4 is constructed by laminating electromagnetic steel plates provided with eight permanent magnet embedding holes 5 in which are embedded permanent magnets 6 along the direction of easy magnetization. The eight permanent magnet embedding holes 5 form four projecting poles by being arranged in a "+" arrangement. That is, the regions sandwiched by permanent magnet embedding holes 5 which are positioned on both sides of non-magnetic portions 8 represent between-pole portions 4b constituting "concavities" in terms of magnetic polarity. Furthermore, permanent magnets 6 which are magnetized so as to cancel the magnetic flux of the armature current passing through adjacent between-pole portions 4b are arranged in permanent magnet embedding holes 5. That is, the relationship of the permanent magnets 6 which are on both sides of pole region 4a is that their directions of magnetization are the same, while the relationship of the two permanent magnets 6 which are positioned on both sides of between-pole region 4b is that their directions of magnetization are mutually opposite in the circumferential direction of rotor 3. Permanent magnets 6 are preferably magnetized practically in the circumferential direction and even more preferably in a direction practically perpendicular to the axis of the magnetic poles.

Next, the operation of the permanent magnet reluctance motor according to the previous application described above will be described. FIG. 2 shows the magnetic flux $\Phi d$ of the component in the direction along the axis of the magnetic pole of rotor core 4 produced by the armature current of the d axis; in order that the core of pole region 4a should provide a magnetic path, the magnetic construction is such that magnetic flux can easily flow, the magnetic resistance in the magnetic path in this direction being very small. Reference symbol 8 denotes a non-magnetic region.

FIG. 3 shows the magnetic flux $\Phi q$ created by the armature current of the q axis of the component in the direction along the axis joining the center of between-pole region 4b and the center of rotor 3. Magnetic flux $\Phi q$ of this between-pole region 4b forms a magnetic path of non-magnetic region 8 and between-pole region 4b that runs transversely across permanent magnets 6. Since the relative permeability of non-magnetic region 8 is "1" and the relative permeability of permanent magnets 6 is also practically "1", the magnetic flux $\Phi q$ produced by the armature current is lowered by the high magnetic resistance action.

The permanent magnets 6 between the magnetic poles are magnetized in the direction practically perpendicular to the axis of the magnetic pole so that, as shown in FIG. 4, a magnetic circuit $\Phi ma$ is formed whereby the magnetic flux generated by permanent magnet 6 flows in the circumferential direction of magnetic region 7 at the boundary of the circumference of the rotor core, through pole region 4a, returning to the pole of opposite polarity.

Also, some of the flux of the permanent magnet 6 passes through the gap, through the pole region 4a of rotor 3 or permanent magnets 6 of the adjacent pole, returning to the original permanent magnets 6 and thereby also forming a magnetic circuit $\Phi mb$.

As shown in FIG. 3, the interlinking magnetic flux of these permanent magnets 6 is distributed in the opposite direction to the magnetic flux $\Phi q$ of the component in the direction of the between-pole center axis produced by the armature current of the q axis, and repels and cancels ingress of armature flux $\Phi q$ from the between-pole region 4b. In the gap outside between-pole region 4b, the gap magnetic flux density created by the armature current is lowered by the magnetic flux of permanent magnets 6, causing it to show larger variation than the gap magnetic flux density outside pole region 4a. That is, the variation of the gap magnetic flux density with respect to position of rotor 3 becomes large, resulting in a large variation of magnetic energy. Furthermore, under load, at the boundary of pole region 4a and between-pole region 4b, a magnetic region 7 exists where there is magnetic short-circuiting; this is strongly magnetically saturated by the load current. As a result, the magnetic flux of permanent magnets 6 that is distributed between the poles is increased. Irregularities representing large changes in the gap flux density distribution are therefore created due to the magnetic flux of permanent magnets 6 and the high magnetic resistance of non-magnetic region 8 and permanent magnets 6; considerable changes in magnetic energy are thereby produced, as a result of which large output is obtained.

The following effects are manifested in regard to the adjustment width of terminal voltage in order to obtain variable speed operation over a wide range. With this proposed permanent magnet reluctance motor, since permanent magnets 6 were only provided over part of the concave portion of the between-pole region 4b, the surface area of permanent magnets 6 was more restricted than in the case of an ordinary permanent magnet motor in which permanent magnets 6 are provided over practically the entire circumference of the surface of rotor 3 and, as a result, the amount of interlinking magnetic flux produced by the permanent magnets 6 was small.

Furthermore, in the non-excited condition, practically all of the magnetic flux of permanent magnets 6 was leakage magnetic flux within rotor core 4 passing through magnetic region 7 of the magnetic pole boundary region. Consequently, since, in this condition, the induced voltage can be made very small, core loss in the non-excited condition is small. Also, overcurrent is small even when armature coil 2 is in a short-circuited defective condition.

When loaded, terminal voltage is induced by addition of the interlinking magnetic flux created by the armature current (exciting current component and torque current component of the reluctance motor) to the interlinking magnetic flux created by the permanent magnets 6.

In an ordinary permanent magnet reluctance, the interlinkage magnetic flux of the permanent magnets 6 represents practically all of the terminal voltage, so it is difficult to adjust the terminal voltage; however, in this permanent magnet reluctance motor, the interlinkage magnetic flux of permanent magnets 6 is small, so a large width of adjustment of the terminal voltage can be achieved by providing a large adjustment of the exciting current component. That is, since the exciting current component can be adjusted in accordance with speed so that the voltage is below the power source voltage, wide-range variable speed operation can be achieved with fixed voltage from the base speed. Also, since the voltage is not suppressed, since a weak field system is implemented under forcible control, even if control becomes inoperable when rotating at high speed, no overvoltage can be generated.

Furthermore, since permanent magnets 6 are also embedded within the core, rotor core 4 constitutes a retaining mechanism for permanent magnets 6, preventing permanent magnets 6 from being flung outwards by the rotation.

As shown in FIG. 3, in a permanent magnet reluctance motor constructed as above, since the magnetic flux "$\Phi q$" produced by the q axis current in the direction of the concavities of rotor 3 produced by the armature current flows through the circumferential-side thin-wall region 18 of the permanent magnet embedding holes and through the thin-wall bridge region 19 on the side nearest the center between the magnetic poles, the difference of the magnetic flux "$\Phi q$" produced by the d axis current and the magnetic flux "$\Phi q$" produced by the q axis current is small, decreasing the reluctance torque. It may be thought that these should be made as narrow as possible in the radial direction in order to decrease the reactive magnetic flux flowing through the circumferential-side thin-wall region 18 of the permanent magnet embedding holes 5 from the circumferential-side of the non-magnetic region 8, i.e. the magnetic flux "$\Phi q$" produced by the reactive q axis current in regard to the rotary torque, and, as shown in FIG. 5, in order to decrease the leakage of magnetic flux generated from permanent magnets 6 (i.e. the reactive magnetic flux 17 of the permanent magnets) in the vicinity of the permanent magnet embedding holes 5 of rotor core 4 and on the circumferential side of between-pole regions 4b. However, with such a shape, it is difficult to support the centrifugal force of the permanent magnets 6 and in particular when applied to an high-speed motor there was a risk of permanent magnets 6 being flung out, causing damage to the rotor 3.

Furthermore, in order to secure the active magnetic flux that is necessary for performance, it is necessary to increase the quantity of permanent magnets 6 in order to compensate for the quantity of magnetic flux corresponding to reactive magnetic flux and leakage magnetic flux, but, because of spatial problems in regard to the overall volume of rotor 3 and strength problems involved in further increasing the force produced by the centrifugal force of the permanent magnets 6, it is difficult to simply increase the quantity of permanent magnets 6.

Also, in order to reduce stress concentrations, in permanent magnet embedding holes 5, the corners of the holes are made of arcuate shape (circular arc); however, since gaps are produced between both sides of the permanent magnets 6 and the permanent magnet embedding holes 5, wedges 15 are necessary in order to locate permanent magnets 6 in position. Consequently, in this construction, permanent magnets 6 must be positionally located by a plurality of wedges 15, increasing the amount of work involved in manufacture and raising costs; furthermore, if the adhesive used to fix permanent magnets 6 and position-locating wedges 15 deteriorated resulting in loss of adhesive effect, the position-locating wedges 15 or permanent magnets 6 could directly strike the circumferential-side thin-wall regions 18 of permanent magnet embedding holes 5 from one side, so stress concentration occurred since these were of small thickness; thus cases occurred of the permanent magnets 6 being flung out or damage to rotor 3 being produced, making the motor incapable of use.

Furthermore, although stress concentration could be correspondingly reduced by increasing the bending radius (radius of curvature) of the corners and both ends of the permanent magnet embedding holes 5, with a construction as above, the shape of wedges 15 for locating permanent magnets 6 in position was made more complicated so it was not possible to increase the bending radius by more than the thickness of permanent magnets 6, with the result that, when speed of rotation and output were further raised, increased force created by the centrifugal force of the permanent magnets 6 made it difficult to support the centrifugal force of permanent magnets 6, with a risk of permanent magnets 6 being flung outwards, damaging rotor 3.

SUMMARY OF THE INVENTION

Accordingly, one object of the present invention is to provide a novel permanent magnet reluctance motor wherein the wedges for positional location of the permanent magnets are dispensed with and insertion of the permanent magnets in assembly is facilitated, thereby making it possible to mechanize the task of magnet insertion during manufacture and wherein, even when the adhesive used co fix the permanent magnets has deteriorated, there is no risk of the permanent magnets being flung out or rotation being impaired and wherein high output, high efficiency, high-speed rotation, reliability and improved ease of manufacture can be achieved by optimizing the cross-sectional shape of the rotor.

In order to achieve the above object, the present invention is constructed as follows. Specifically, in a permanent magnet reluctance motor comprising: a stator having an armature coil and a rotor providing magnetic irregularities in the circumferential direction by the provision of permanent magnets in permanent magnet embedding holes within the rotor core such as to cancel the magnetic flux of the armature passing through between adjacent magnetic poles and by the provision of non-magnetic regions on the circumferential-side of the permanent magnets between the magnetic poles; projections are provided for positional location of the permanent magnets in such a way as to project into the permanent magnet embedding holes within the core of the rotor.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
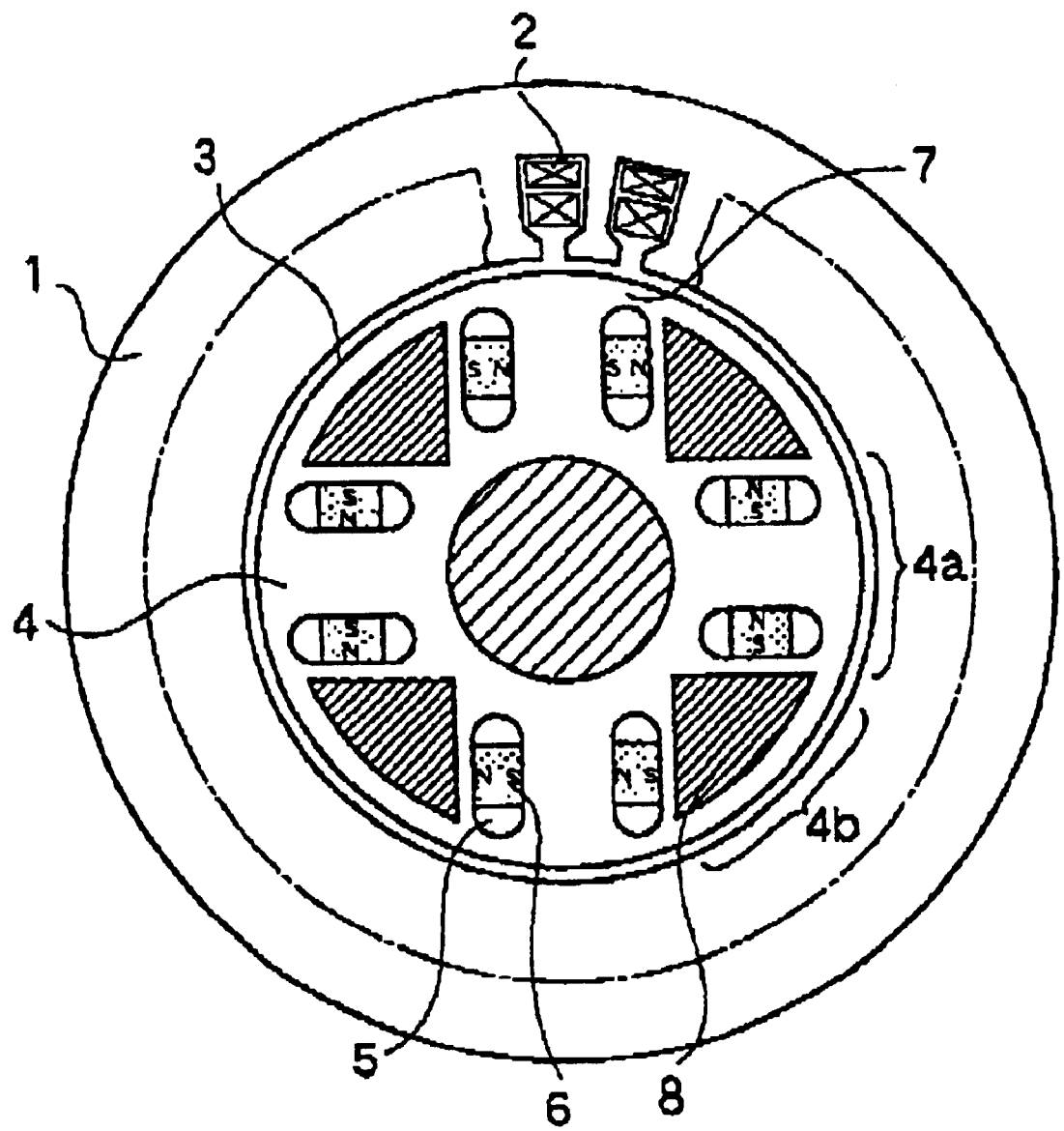
FIG. 1 is a radial cross sectional view of a permanent magnet reluctance motor according to the invention of the previous application.
Figure 2:
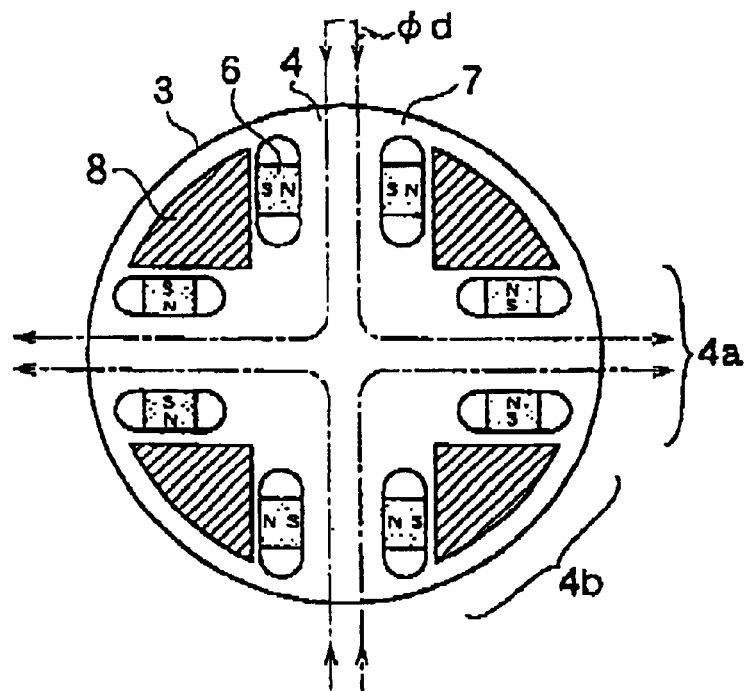
FIG. 2 is a radial cross-sectional view illustrating the flow of magnetic flux $\Phi d$ of the component in the direction along the axis of the magnetic pole of the rotor core produced by the d axis armature current.
Figure 3:
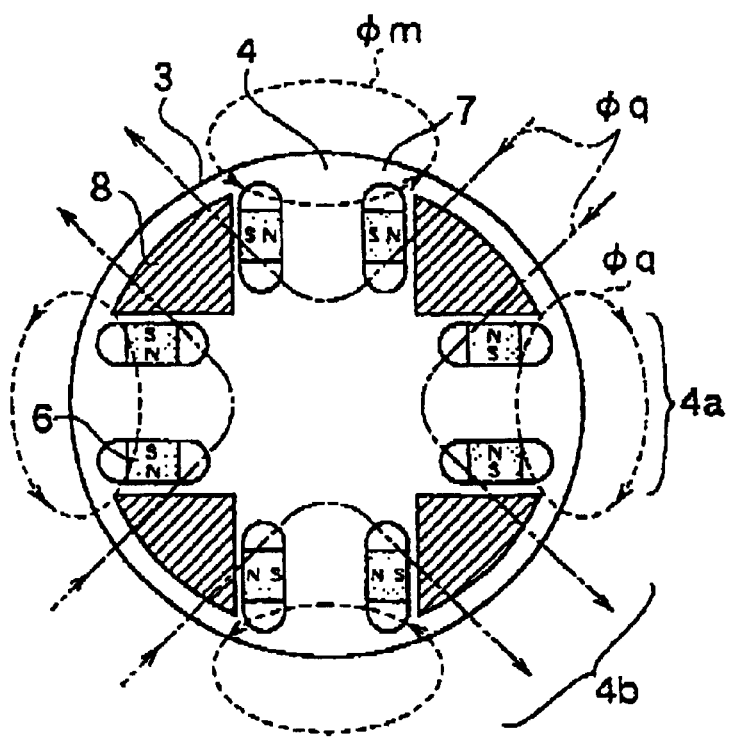
FIG. 3 is a radial cross-sectional view illustrating the flow of magnetic flux $\Phi q$ of the component in the direction along the axis in the radial direction centered on axial between-pole region 4b produced by the q axis armature current.
Figure 4:
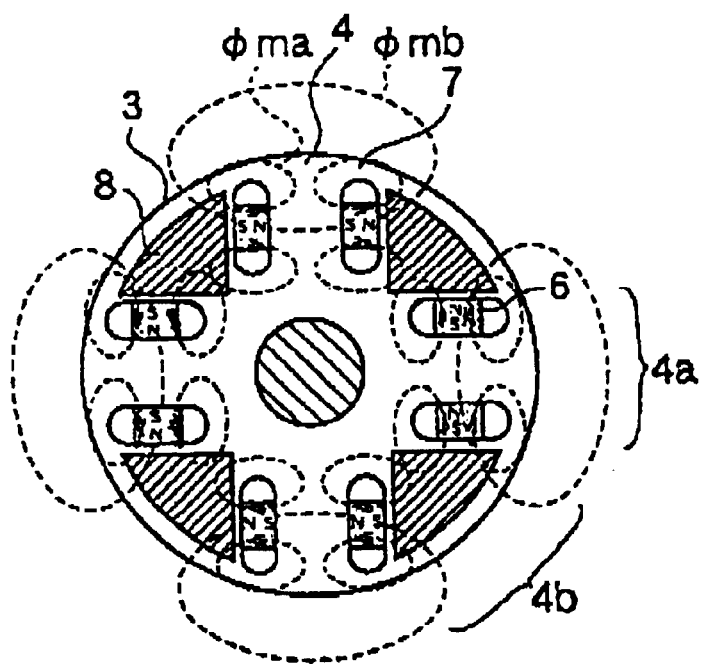
FIG. 4 is a radial cross-sectional view illustrating the flow of magnetic flux generated by the permanent magnets.
Figure 5:
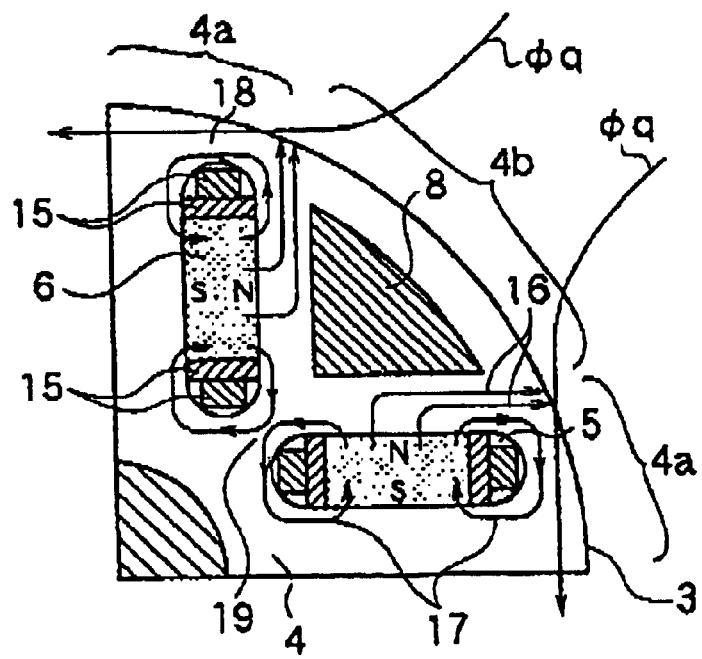
FIG. 5 is a cross-sectional view to a larger scale in the radial direction of the rotor illustrating the flow of magnetic flux generated by the permanent magnets.

Referring now to the drawings, wherein like reference numerals designate identical or corresponding parts throughout the several views, and more particularly to FIG. 6 thereof, one embodiment of the present invention will be described.

An embodiment of the present invention is described in detail below with reference to the drawings. FIG. 6 and FIG. 7 illustrate a first embodiment of a permanent magnet reluctance motor according co the present invention. Although hereinbelow a four-pole rotor permanent magnet reluctance motor will be described, the benefits of the present invention do not depend on the number of poles.

Stator 1 is provided with armature coils 2; rotor 3 is accommodated in the interior thereof. Rotor 3 comprises a rotor core 4 and permanent magnets 6.

Rotor core 4 has a direction in which magnetization is easy and a direction in which it is difficult. Specifically, rotor core 4 is constructed by laminating electromagnetic steel plate provided with permanent magnet embedding holes 5 for embedding respectively eight permanent magnets 6 along its direction of easy magnetization, in order to form magnetic irregularities in the circumferential direction. The eight permanent magnet embedding holes 5, 5 are arranged in "+" shape, forming four projecting poles.

That is, the portions in rotor core 4 that are sandwiched by the permanent magnet embedding holes 5 positioned on both sides of non-magnetic regions 8 represent between-pole regions 4b, and constitute magnetic concavities. Permanent magnets 6 magnetized in directions so as to cancel the magnetic flux, created by the armature currents, passing through adjacent between-pole regions 4b are arranged in permanent magnet embedding holes 5. Specifically, permanent magnets 6 that are positioned on both sides of pole regions 4a have the same direction of magnetization; permanent magnets 6 that are positioned on both sides of between-pole regions 4b are arranged such that their directions of magnetization are mutually opposite in the circumferential direction of rotor 3.

Preferably, permanent magnets 6 are magnetized in the circumferential direction and even more preferably are arranged so that they are magnetized in the direction practically perpendicular to the pole axis. Non-magnetic region 8 in between-pole region 4b is constituted by a gap region.

In permanent magnet embedding holes 5 in rotor core 4, permanent magnet position-locating projections 12 are formed projecting into the interior of these holes. As shown in FIG. 7, the length of the side (arm) "X" where permanent magnet 6 and permanent magnet position-locating projection 12 are in contact is set at 5% to 75% of the side length "Y" of permanent magnet 6. Also, radiussed portions 13 (clearances) at the root of permanent magnet position-locating projections 12 are provided on both sides of permanent magnets 6 on the opposite side to non-magnetic region 8, intersecting the direction of magnetization at right angles.

Furthermore, in rotor 3, the thickness "b1" in the radial direction of circumferential-side thin-wall region in formed by permanent magnet embedding holes 5 is at least 0.5 mm or more, and the length "b2" in the circumferential direction is set to be within 450% of this thickness "b1" in the radial direction of circumferential-side thin-wall region 18. Furthermore, in rotor 3, the thickness "a1" in the circumferential direction of thin-wall bridge region 19 on the side nearest the center of the rotor formed between the edges of permanent magnet embedding holes 5 that face each other on either side of non-magnetic region 8 is at least 0.5 mm or more and its length "a2" in the radial direction is set to be within 450% of this thickness "a1" in the circumferential direction.

Next, the performance of a permanent magnet reluctance motor according to this first embodiment will be described. In the permanent magnet reluctance motor of this embodiment, just as in the case of the permanent magnet reluctance motor of the previous application, very considerable changes in magnetic energy are produced due to the irregularities created by the magnetic resistance of permanent magnets 6 and the magnetic flux of permanent magnets 6, which provide large variations in the gap flux density distribution. Also, since permanent magnets 6 are supported by permanent magnet position-locating projections 12 provided in permanent magnet embedding holes 5, the position-locating wedges 15 that were employed in the permanent magnet reluctance motor of the previous application can be dispensed with and the task of inserting the permanent magnets during assembly is facilitated; furthermore, even if the adhesive used for fixing permanent magnets 6 in permanent magnet embedding holes 5 deteriorates, permanent magnets 6 can be reliably held by the permanent magnet position-locating projections 12.

Furthermore, the length of the side "X" where permanent magnet 6 and permanent magnet position-locating projection 12 are in contact is set to 5% to 75% of the side length "Y" of permanent magnet 6. Specifically, the side length "X" of permanent magnet position-locating projections 12 is made such that the centrifugal force created by permanent magnet 6 is supported by means of the faces intersecting at right angles the direction of permanent magnet magnetization on the side of permanent magnet embedding holes 5 nearest non-magnetic region 8, and that the stress of the circumferential-side thin-wall region 18 of permanent magnet embedding hole 5 and the thin-wall bridge region 19 between the permanent magnet embedding holes on the side nearest the center between the poles is within the allowed value (side length "X" minimum: 5%), and the stress of the radiussed portions 13 of the root of the permanent magnet position-locating projections 12 is within the allowed value (side length "X" maximum: 75%). In this way, the force produced by the centrifugal force of permanent magnet 6 is effectively shared by the face intersecting the permanent magnet magnetization direction at right angles on the side of permanent magnet embedding holes 5 nearest non-magnetic region 8 and projections 12 for positional location of the permanent magnet.

Furthermore, by providing the radiussed portions 12 of the root of the permanent magnet position-locating projection 12 on the side of the face that intersects at right angles the direction of permanent magnet magnetization on the opposite side to the non-magnetic region 8, the radiussed portions 13 can be provided without decreasing the side length "X" where the permanent magnet 6 and permanent magnet position-locating projection 12 are in contact and a spatial margin is thereby conferred; consequently, the bending radius (radius of curvature) of the radiussed portions 13 can be made large and stress of the radiussed portions 13 can thereby be reduced to a minimum.

Also, by making the radial thickness "b1" of circumferential-side thin-wall region 18 of permanent magnet embedding hole 5 at least 0.5 mm or more and making the length "b2" of the thin-wall region in the circumferential direction no more than 450% of the thickness "b1" in the radial direction, generation of strain or defects etc by punching of the core when manufacturing rotor core 4 is avoided (thickness "b1" in the radial direction: at least 0.5 mm or more) and the reactive flux 17 (leakage flux) generated by permanent magnet 6 and q axis current is reduced, enabling the flux produced by permanent magnets 6 to be effectively utilized; as a result, the quantity of permanent magnets 6 can be reduced to the necessary minimum. In addition, the bending stress generated in circumferential-side thin-wall region 18 of permanent magnet embedding hole 5 by the centrifugal force of permanent magnet 6 can be reduced to the minimum (length "b2" in the circumferential direction no more than 450% of the thickness "b1" in the radial direction).

Furthermore, by making the thickness in the circumferential direction of thin-wall bridge region 19 between permanent magnet embedding holes 5 on the side of the center between the poles "a1" at least 0.5 mm or more, and by making the length "a2" in the radial direction of thin-wall bridge region 19 no more than 450% of the thickness "a1" in the circumferential direction, distortion and defects etc. produced by core punching during manufacture of the rotor core 4 can be avoided (radial thickness "b1" at least 0.5 mm or more), and the reactive flux 17 generated by permanent magnets 6 (leakage flux) can be reduced and, in addition, the stress generated in thin-wall bridge region 19 on the central side between the poles by the force produced by the centrifugal force of the permanent magnet 6 can be reduced to the minimum (length "a2" in the radial direction within 450% of thickness "a1" in the circumferential direction).

In this way, in a permanent magnet reluctance motor according to the first embodiment, permanent magnet insertion during manufacture can be facilitated and consequently mechanized, making it possible to reduce manufacturing costs. Also, even if the adhesive used to fix the permanent magnets deteriorates, the permanent magnets can be retained safely, so any risk of the permanent magnets being flung out or damage so the rotor can be eliminated, improving reliability.

Furthermore, since the force produced by the centrifugal force of the permanent magnets can be effectively shared, the stress generated within the rotor core can be reduced to a minimum, improving reliability.

In addition, the stress value at the radiussed portion of the root of the projections for permanent magnet position-locating can be reduced to the minimum, thereby enabling high rotational speed to be achieved and reliability to be improved. Furthermore, by optimizing the shape of the thin-wall regions 18 and 19 within the rotor core, high output, high efficiency and high-speed rotation can be achieved and reliability and ease of manufacture very considerably improved.

Figure 8:
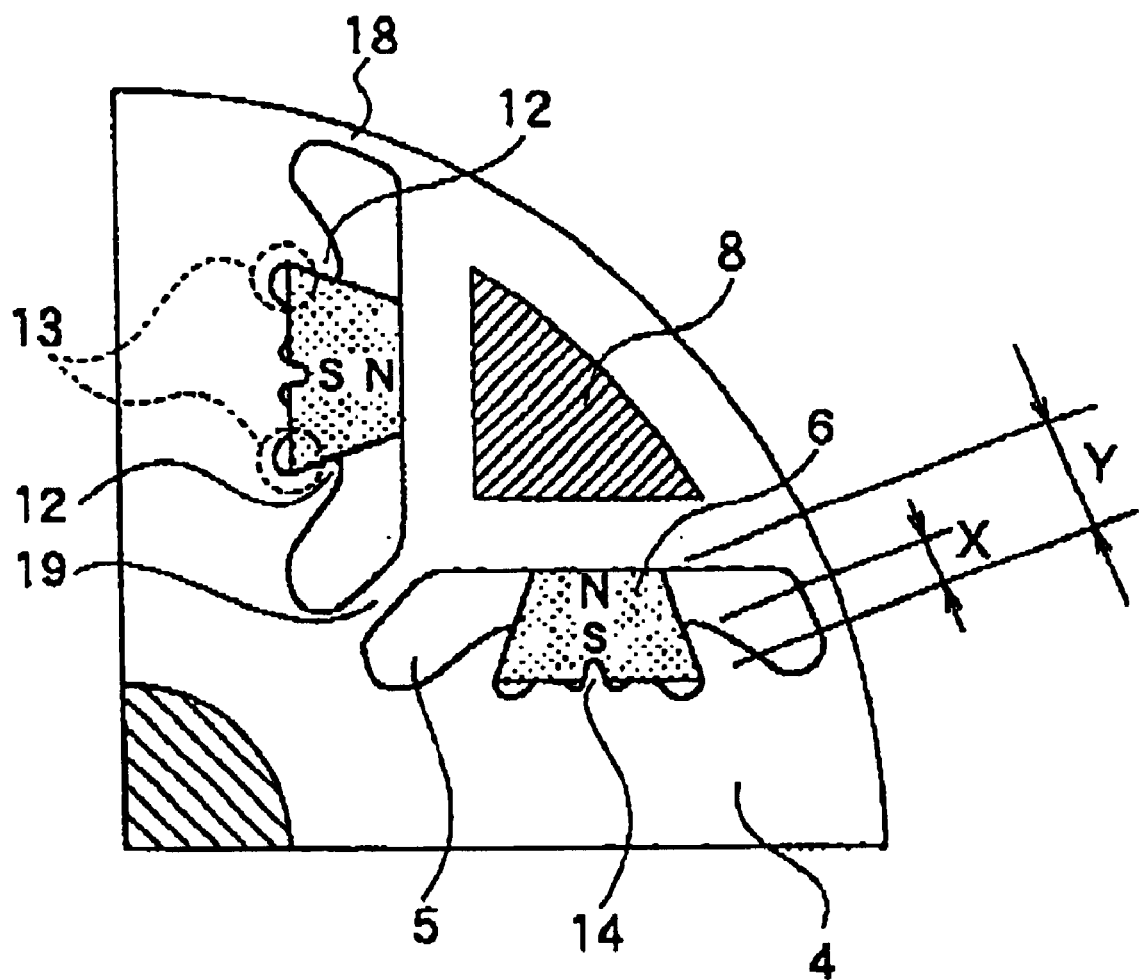
FIG. 8 is a cross-sectional view to a larger scale in the radial direction of the rotor illustrating a second embodiment of the present invention.

Next a permanent magnet reluctance motor according to a second embodiment of the present invention will be described with reference to FIG. 8. In the second embodiment, permanent magnet 6 is made trapezoid-shaped in cross section, and a permanent magnet position-locating central projection 14 is provided in permanent magnet embedding hole 5 so as to hold this in a position corresponding to the center of its bottom face, in addition to permanent magnet position-locating projections 12 similar to those of the first embodiment. Also, the construction is such that the force produced by the centrifugal force of permanent magnet 6 is supported at a face thereof that intersects the direction of magnetization of permanent magnet 6 at right angles and which is on the opposite side of permanent magnet embedding hole 5 to that of non-magnetic region 8.

Figure 6:
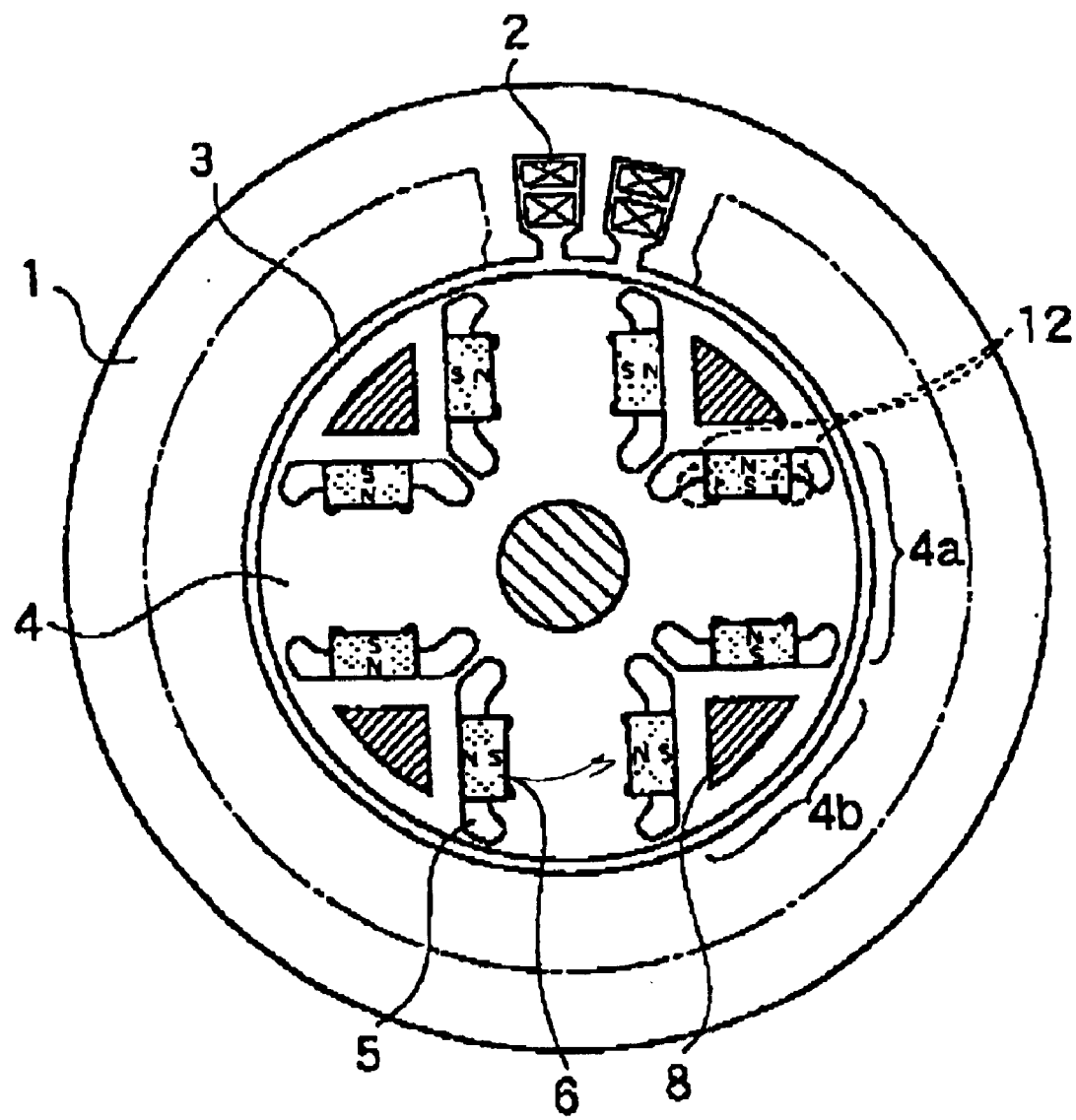
FIG. 6 is a cross-sectional view in the radial direction illustrating a first embodiment of the present invention.
Figure 7:
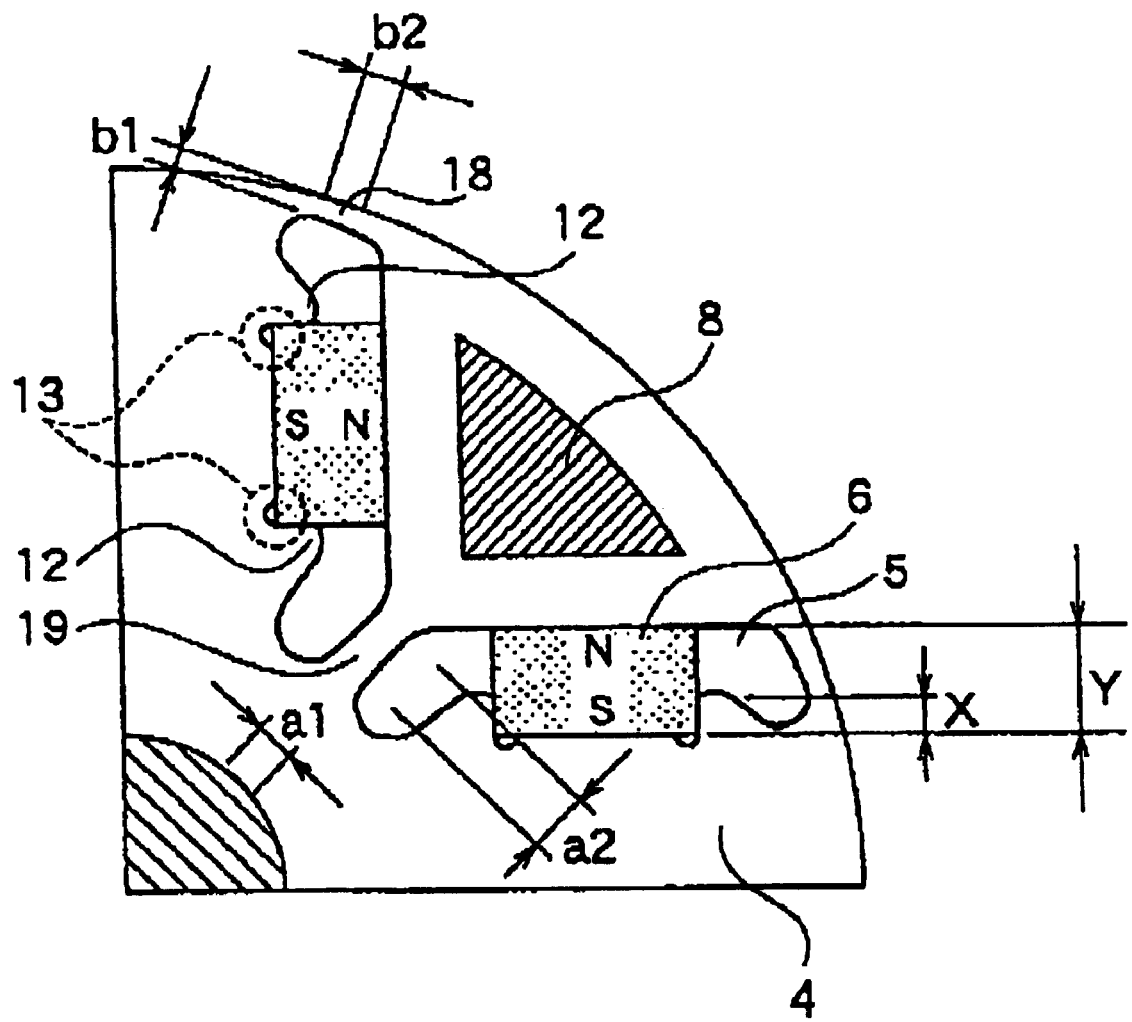
FIG. 7 is a cross-sectional view to a larger scale in the radial direction of the rotor of the above embodiment.

The remaining structural elements are common to the first embodiment illustrated in FIG. 6 and FIG. 7 and so are illustrated with the same reference symbols appended.

Next, the performance of the permanent magnet reluctance motor of this second embodiment will be described. In a permanent magnet reluctance motor constructed in this way, the central projection 14 for positional location of the permanent magnet is positioned in the middle of permanent magnet embedding hole 5 and the force produced by the centrifugal force of permanent magnet 6 can be supported on the inner circumferential side of a rotor 3 in which the mean stress is comparatively small, so the stress on the support of permanent magnet 6 (central projection 14 for positional location of the permanent magnet) can be kept to the minimum and the contacting portion with permanent magnet 6 makes contact over the entire central projection 14 for positional location of the permanent magnet; as a result, permanent magnet 6 can be held in stable fashion.

Furthermore, since a construction is adopted in which the force produced by the centrifugal force of the permanent magnet is supported at a face that intersects the direction of magnetization of permanent magnet 6 at right angles and is on the opposite side of the permanent magnet embedding hole 5 to that of non-magnetic region 8, stress can be reduced to a minimum, since the force produced by the centrifugal force of the permanent magnet is supported on the opposite side of permanent magnet embedding hole 5 to that of non-magnetic region 8 i.e. it is supported where the mean stress is comparatively small.

In this way, with the permanent magnet reluctance motor of the second embodiment, even if the adhesive used to fix the permanent magnets deteriorates, the permanent magnets can still be held safely; as a result, any risk of the permanent magnets being flung out or the rotor being damaged can be eliminated and reliability therefore improved. Furthermore, since the force produced by the centrifugal force of the permanent magnets is supported on the inner circumferential side of the rotor i.e. where the mean stress is comparatively small, the stress of the central projections 14 for positional location of the permanent magnets can be kept to a minimum and the permanent magnets can be held in stable fashion, thereby improving reliability.

Furthermore, since the force produced by the centrifugal force of the permanent magnet 6 is supported on the opposite side of permanent magnet embedding hole to that of non-magnetic region 8 i.e. where the mean stress is comparatively small, the stress can be kept to a minimum and higher output and even higher speeds of rotation can be achieved and reliability is also improved.

As described above, with a permanent magnet reluctance motor according to the present invention, since a projection for a permanent magnet positional location is provided in the permanent magnet embedding hole within the core of the rotor, permanent magnet insertion during manufacture is facilitated, making it possible to mechanize this and to reduce production costs; also, even if the adhesive used to fix the permanent magnet deteriorates, the permanent magnet can be securely and safely held by the projection for positional location of the permanent magnet, so any risk of the permanent magnets being flung out, damaging the rotor, can be eliminated, thereby improving reliability.

Also, according to the present invention, by optimizing the area where the permanent magnet and the projection for positional location of the permanent magnet make contact, the force produced by the centrifugal force of the permanent magnet can be effectively shared, thereby enabling the stress generated within the core of the rotor to be reduced to a minimum and also improving reliability.

Furthermore, by optimizing the shape of the thin-wall regions within the rotor core, high output, high efficiency and high-speed rotation can be achieved and reliability and ease of manufacture very considerably improved. Also, since the force produced by centrifugal force of the permanent magnets is supported at a portion where the mean stress is comparatively small, the stress value of the support can be kept to a minimum, enabling higher rotational speeds to be achieved and also improving reliability.

Obviously, numerous additional modifications and variations of the present invention are possible in light of the above teachings. It is therefore to be understood that within the scope of the appended claims, the present invention may be practiced otherwise than as specially described herein.

What is claimed is:

1. A permanent magnet reluctance motor comprising:
   a stator having an armature coil;
   a rotor configured for providing magnetic irregularities in a circumferential direction wherein the rotor includes permanent magnets in a plurality of permanent magnet embedding holes within a rotor core wherein a magnetic flux of an armature passing through between adjacent magnetic poles is canceled, and wherein the rotor further includes non-magnetic regions on a circumferential side of said permanent magnets between said magnetic poles; and
   a plurality of projections configured to fix positional location of said permanent magnets, the plurality of projections configured to project into said permanent magnet embedding holes within said core of said rotor, at least one of the plurality of projections having a substantially planar surface portion configured to planarly contact a length of at least one side of the permanent magnet, the length being bound by an edge of the permanent magnet.

2. The permanent magnet reluctance motor of claim 1, wherein said projections for positional location of said permanent magnets are provided on opposite edges of said permanent magnet embedding holes of edges of said non-magnetic regions.

3. The permanent magnet reluctance motor of claim 1, wherein said projections for positional location of said permanent magnets are provided on edges of said permanent magnet embedding holes on sides of said non-magnetic magnetic regions.

4. The permanent magnet reluctance motor of claim 1, wherein said projections for positional location of said permanent magnets are provided so as to project towards centers of said permanent magnet embedding holes into recesses corresponding to said projections.

5. The permanent magnet reluctance motor of claim 1, wherein the length of the at least one side of the permanent magnet where said permanent magnet and said projection make contact is 5% to 75% of the length of the at least one side of the permanent magnet.

6. The permanent magnet reluctance motor of claim 1, wherein a centrifugal force on said permanent magnet is supported by a face intersecting a direction of magnetization of said permanent magnet at right angles and on an opposite side of said permanent magnet embedding hole to a side of the non-magnetic region.

7. The permanent magnet reluctance motor of claim 1, wherein a radiussed portion of a root of said projection for positional location of said permanent magnet is provided on a side of a face intersecting a direction of magnetization of said permanent magnet at right angles and on an opposite side to a side of said non-magnetic region.

8. The permanent magnet reluctance motor of claim 1, wherein a length in a circumferential direction of a circumferential-side thin-wall region of said permanent magnet embedding hole in said rotor core is no more than 450% of a thickness of said thin-wall region in a radial direction.

9. The permanent magnet reluctance motor of claim 8, wherein a thickness in a radial direction of said circumferential-side thin-wall region of the permanent magnet embedding hole in said rotor core is at least 0.5 mm.

10. The permanent magnet reluctance motor of claim 1, wherein a length in a radial direction of a bridge region between adjacent permanent magnet embedding holes in said rotor core is no more than 450% of a thickness in a circumferential direction of a bridge region on a side nearest a center.

11. The permanent magnet reluctance motor of claim 10, wherein a thickness on the side nearest the center in a circumferential direction of said bridge region between adjacent permanent magnet embedding holes in said rotor core is at least 0.5 mm.

* * * * *